United States Patent
Hatlestad

Patent Number: 5,555,464
Date of Patent: Sep. 10, 1996

[54] RED/NEAR-INFRARED FILTERING FOR CCD CAMERAS

[75] Inventor: John D. Hatlestad, Burnsville, Minn.

[73] Assignee: Lockheed Martin Corporation, Bethesda, Md.

[21] Appl. No.: 506,987

[22] Filed: Jul. 28, 1995

[51] Int. Cl.$^6$ ........................................ H04N 9/07
[52] U.S. Cl. ........................ 348/266; 348/273; 348/280
[58] Field of Search .................................. 348/222, 266, 348/272, 273, 279, 280, 164, 166, 33; 358/41, 44, 43, 113; H04N 9/04, 9/07, 9/09, 5/33

[56] References Cited

U.S. PATENT DOCUMENTS

| | | | |
|---|---|---|---|
| 4,037,048 | 7/1977 | Walker | 348/164 |
| 4,651,001 | 3/1987 | Harada et al. | 250/330 |
| 4,663,656 | 5/1987 | Elabd et al. | 358/75 |
| 4,688,085 | 8/1987 | Imaide | 348/237 |
| 5,132,802 | 7/1992 | Osthues et al. | 358/213.28 |
| 5,350,490 | 9/1994 | Lee | 156/655 |

FOREIGN PATENT DOCUMENTS

| | | |
|---|---|---|
| 8912941 | 12/1989 | WIPO. |
| 9311630 | 6/1993 | WIPO. |

OTHER PUBLICATIONS

E. Franz, M. R. Gebhardt, K. B. Unklesbay, "The Use of Local Spectral Properties of Leaves as an Aid for Identifying Weed Seedlings in Digital Images," Transactions of the ASAE, vol. 34(2): Mar.–Apr. 1991, pp. 682–687.

B. B. Nitsch, K. Von Bargen, G. E. Meyer, "Visible and Near Infrared Plant, Soil and Crop Residue Reflectivity for Weed Sensor Design," ASAE, Paper No. 913006.

Sony brochure for ICCD R.G.B. Primary Color Filter Camera Module XC–711/711P.

*Primary Examiner*—John K. Peng
*Assistant Examiner*—Sherrie Hsia
*Attorney, Agent, or Firm*—Glenn W. Bowen

[57] ABSTRACT

A CCD camera is adapted for detecting red and near-infrared wavelengths by employing filters that are constructed to allow for the passage of only red light in certain areas and near-infrared light in other areas of the filter. The areas are designed to match the pixel geometry of the lens of a primary color CCD camera that has a predefined pattern of red, blue and green pixels. The match is such that the red bandpass filter areas overlay the red pixels, and the near-infrared bandpass filter areas match the blue and green pixel areas. The red, green and blue output lines of the CCD camera are supplied to a signal processor which uses the signals on these lines to provide combinations of red and near-infrared magnitude that are capable of detecting vegetation from a background. The camera is suitable for full color use again merely by removing the filter that provides R and NIR sensing without otherwise disabling or modifying the camera.

3 Claims, 5 Drawing Sheets

RED/NEAR-INFRARED FILTERING FOR CCD CAMERAS

BACKGROUND OF THE INVENTION

1. Field of the Invention

The current invention relates to a conventional charge-coupled-device (CCD) camera that is optimized for the detection of living plants (green biomass) against a possibly complex (non-homogeneous) background by use of a single filter that does not require a specialized design for the CCD camera.

2. Discussion of Background Information

A number of articles in the literature teach that living green plants can be detected by use of a ratio, or a normalized ratio, of the reflectance of incident light in the near-infrared (NIR) region to reflected light in the red (R) region. One such article is entitled "Visible and Near-infrared Plant, Soil and Crop Residue Reflectivity for Weed Sensor Design," by B. B. Nitsch, K. Von Bargen, G. E. Meyer and D. A. Mortensen, which was delivered at the ASAE 1991 Summer Meeting, Paper No. 913006. The current invention is for a video sensor that can provide the information necessary to compute such ratios.

The ratio of the reflection of light from the near-infrared (NIR) and the red (R) portions of the spectrum is a reliable detector of living plants against various backgrounds of soil and crop residue. For example, this information is conveyed in the Nitsch et al. article. This ratio of NIR/R signal strength is called in this paper the "vegetative index." Alternative ratios of R and NIR may be used, one of which is the ratio of NIR-R/NIR+R, which is termed the normalized difference ratio which is described in this same article. The ratio of NIR/R may be utilized where the NIR intensity is obtained from a portion of the spectrum from approximately 700 nm to 850 nm, and the R intensity is obtained from a region around 600 nm to 650 nm. This may be used to differentiate plant growth from background soil and crop residue.

These ratios are employed in the agricultural field for the detection and identification of vegetation and growing crops, and data for these ratios are collected by three methods.

In the first method an optical fiber with a wide field of view lens is used to transmit the light to an optical beam-splitter. The beam-splitter divides the light into two channels. An NIR filter is applied to one channel and an R filter to the other channel. A ratio of the response in the two channels is used to form the NIR to R components of the intensity ratio that is selected to detect the vegetation. In a variation of this system, two separate sensors are directly employed so that the optical fiber and optical beam-splitter are not needed. Since the resolution is coarse in this version, an accurate registration of the two sensors is not necessary. This technique is described in the paper entitled "A Microprocessor Controlled Technology to Selectivity Spot Spray Weeds," by W. L. Fenton, A. F. Doss, P. G. Nash and K. R. McCloy, Automated Agriculture for the 21st Century, Proceedings of the 1991 Symposium, 16–17 Dec., 1991, Chicago, published by ASAE.

In the second method, a spectroradiometer is employed to provide the frequency selectivity. This technique is described in the Nitsch et al. article.

In the third method, video cameras are employed to gather the data with the wavelength selectivity provided by manually inserting filters in front of the camera. This requires that the camera and the subject be stationary over the time it takes to replace one filter with the other. This technique is described in a paper entitled "The Use of Local Spectral Properties of Leaves as an Aid for Identifying Weed Seedlings in Digital Images," by e. Franz, M. R. Gebhardt and K. B. Unkesbay, ASAE 1990 International Summer Meeting, Paper No. 90-7044.

A brochure for the Sony Model XC-711/711P R.G.B. Primary Color Filter Camera discloses primary color red/green/blue pixels for CCD cameras. For this XC-711 camera, these pixels are arranged into primary color vertical stripes, as shown in FIG. 1. In some other color cameras, the pixels are arranged in a mosaic pattern, as shown in FIG. 2.

The difficulty of utilizing infrared (IR) imaging devices for the detection of cold targets is recognized in U.S. Pat. No. 5,132,802 which issued Jul. 21, 1992 to Osthues et al., and is entitled "High Contrast Image Apparatus Employing Optical Filters to Cause Each Image Pick-Up Element to have its Maximum Sensitivity in a Different Spectral Range." The apparatus of the Osthues et al. patent is described in the embodiment which is directed to the detection of military objects which may be surrounded by natural vegetation and may be camouflaged. The system of the Osthues et al. patent utilizes two image pick-ups which are selected to have two different wavelength ranges. In this patent the reflection from the vegetation is considered to be clutter. One of the wavelength ranges is selected so that the reflection characteristics of the object and of the surrounding natural vegetation are as similar as possible. The second wavelength is selected so that there is the greatest possible difference between the reflection behavior or the object to be detected and that of the vegetation.

Two separate CCD cameras are utilized in the Osthues et al. patent so that each camera receives and operates on one of the two wavelengths. The first wavelength, which is selected so that the characteristics of the object and the natural vegetation are as similar as possible, lies in the near-infrared (NIR) range. This wavelength is equal to, or greater than, the range of 0.7 µm to 2 µm. The second wavelength, which is utilized to distinguish the background of the object, lies between 0.2 µm and 0.6 µm.

Specialized CCD camera designs are shown in U.S. Pat. Nos. 4,651,001 entitled "Visible/Infrared Imaging Device with Stacked Cell Structure," issued Mar. 17, 1987 to Nozomu Harada, et al., and 4,663,656, entitled "High-Resolution CCD Imagers Using Area-Array CCD's for Sensing Spectral Components of an Optical Line Image," issued May 5, 1987 to Hammam Elabd, et al., which show infrared sensing along with visible light sensing. U.S. Pat. No. 5,350,490 entitled "Forming a Color Filter on a Semiconductor Substrate," issued Sep. 27, 1994 to Hyung S. Lee, shows how a color filter may be formed on a semiconductor substrate for CCD or bucket brigade device (BBD). The CCD device of this patent is an interline-transfer charge coupled device (IT-CCD).

SUMMARY OF THE INVENTION

A conventional color CCD camera having a lens of a multitude of red and near-infrared responsive, green and near-infrared responsive, and blue and near-infrared responsive pixels arranged in a predefined pattern is converted to a vegetation-detecting camera by placing a filter over the CCD pixels. The filter is constructed so that it filters out light other than red, including near-infrared, from reaching the red and nearIo infrared responsive pixels, and allows only near-infrared light to reach the green and near-infrared responsive and the blue and near-infrared responsive pixels. Red, green and blue output lines then provide signals which are representative of the red and near-infrared input light, and these are supplied to a signal processor where they are utilized to detect vegetation or other objects. The camera is converted directly back to use for color images merely by removing the added filter adapter.

BRIEF DESCRIPTION OF THE DRAWINGS

The invention is shown by reference to the drawings in which.

TECHNICAL DESCRIPTION OF THE INVENTION

Figure 1:
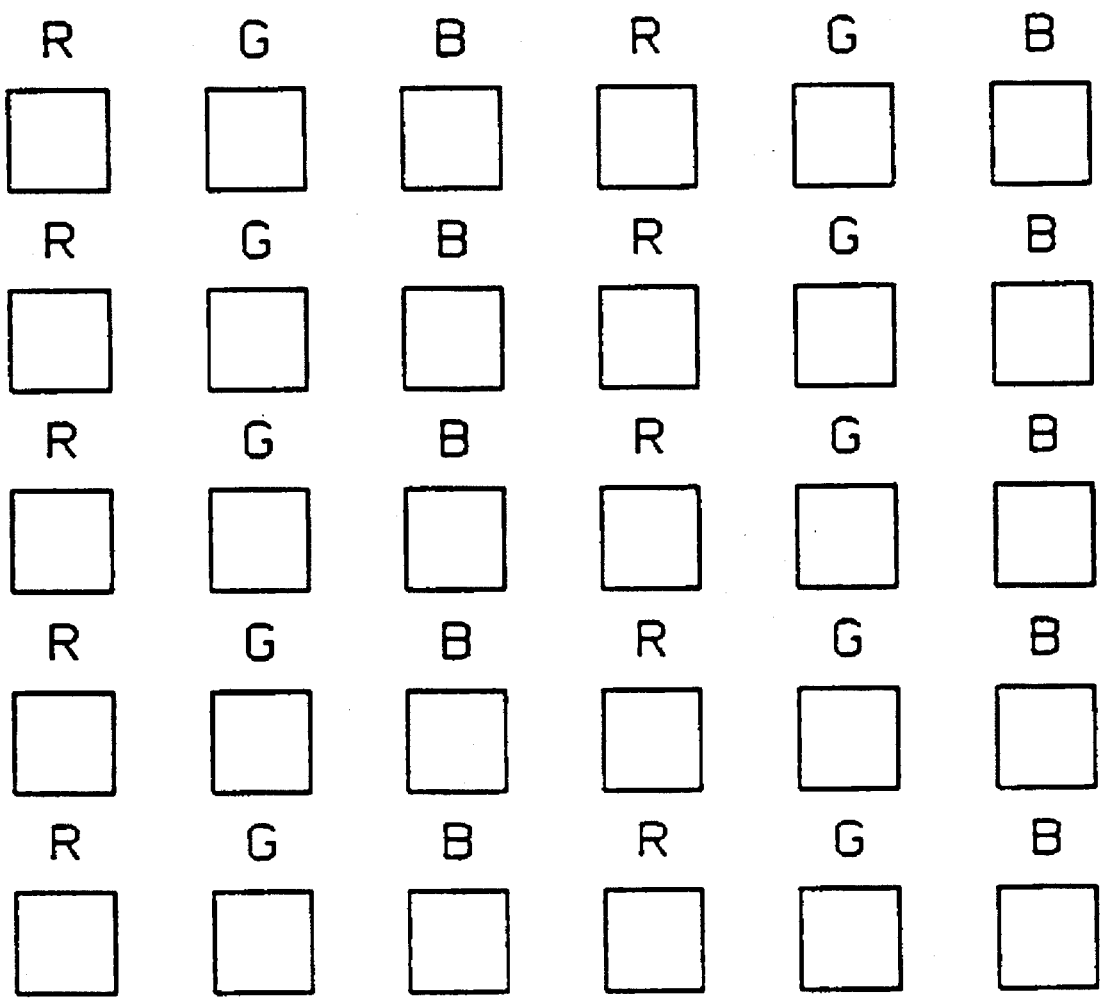
FIG. 1 is a diagram that illustrates a portion of the red, green and blue pixels of a primary color CCD camera that is implemented with the pixels aligned in a vertical stripe filter pattern.

The present invention is used to modify the characteristics of a conventional CCD camera or video sensor that has primary red, green and blue color responses and provides signal outputs on the green and blue output lines which represents received near-infrared (NIR) light intensity which is approximately from 800–850 nanometers in wavelength, and a signal output on the red output line which represents received R light intensity which is approximately from 600–650 nanometers in wavelength. Conventional color CCD cameras employ a multitude of primary color red, green and blue responsive pixels which are selected to respectively respond to the intensity of red, green and blue color light that impinges thereon. The pixels are also responsive to near-infrared light. Therefore, the terms red pixels, green pixels and blue pixels in this document are also respectively equivalent to the terms red and near-infrared responsive pixels, green and near-infrared responsive pixels, and blue and near-infrared responsive pixels, which are also used in this document.

The invention involves the making of a filter that has defined areas where red (R) and near-infrared (NIR) light are respectively allowed to pass and light of other colors is blocked. Such filters may be made in a number of ways. One way is to deposit interference filter coatings on a piece of glass or plastic in any conventionally known manner over the red, green and blue bandpass filters of a conventional CCD camera based on the passband and attenuation characteristics of the desired filters.

Once the filters are constructed, they can be utilized to carry out the purpose of the invention which is to allow conventional primary color CCD cameras to be used for detecting vegetation by converting such cameras to R and NIR sensors in an inexpensive but effective manner. The pixel geometry of the CCD array is obtained from the manufacturer of the CCD camera or through precise measurement under a microscope and is utilized to determine the desired pattern of R and NIR areas. Masks are prepared to precisely define these areas. The filter coatings are then applied through the masks to the glass or plastic overlays that are to be secured over the lens of the CCD camera in order to match the pixel geometry. If desired, the coatings may be directly applied to the face of the CCD, but then the camera could not be used for normal color viewing by merely revising the filter coatings. The filters cover all, or at least a portion of the active pixel area of the CCD camera, to provide R and NIR signals sufficient to detect vegetation.

The R filter coating is applied over what would have been the red pixels of an unmodified camera, and is constructed to allow R color wavelengths to pass and to block NIR wavelengths since the pixels of CCD cameras respond to light within the wavelength range of approximately 400–1000 nm, including both visible light and NIR wavelengths. The NIR filter coatings allow for the passage of only a narrow band of NIR wavelength in the region of approximately 750–1000 nm. These coatings are applied over what would have been the blue and green pixels of an unmodified camera to allow for the passage of only NIR wavelengths to which these pixels also respond and to block red, blue and green colors and other wavelengths that ordinarily might cause a response in these pixels.

Figure 3:
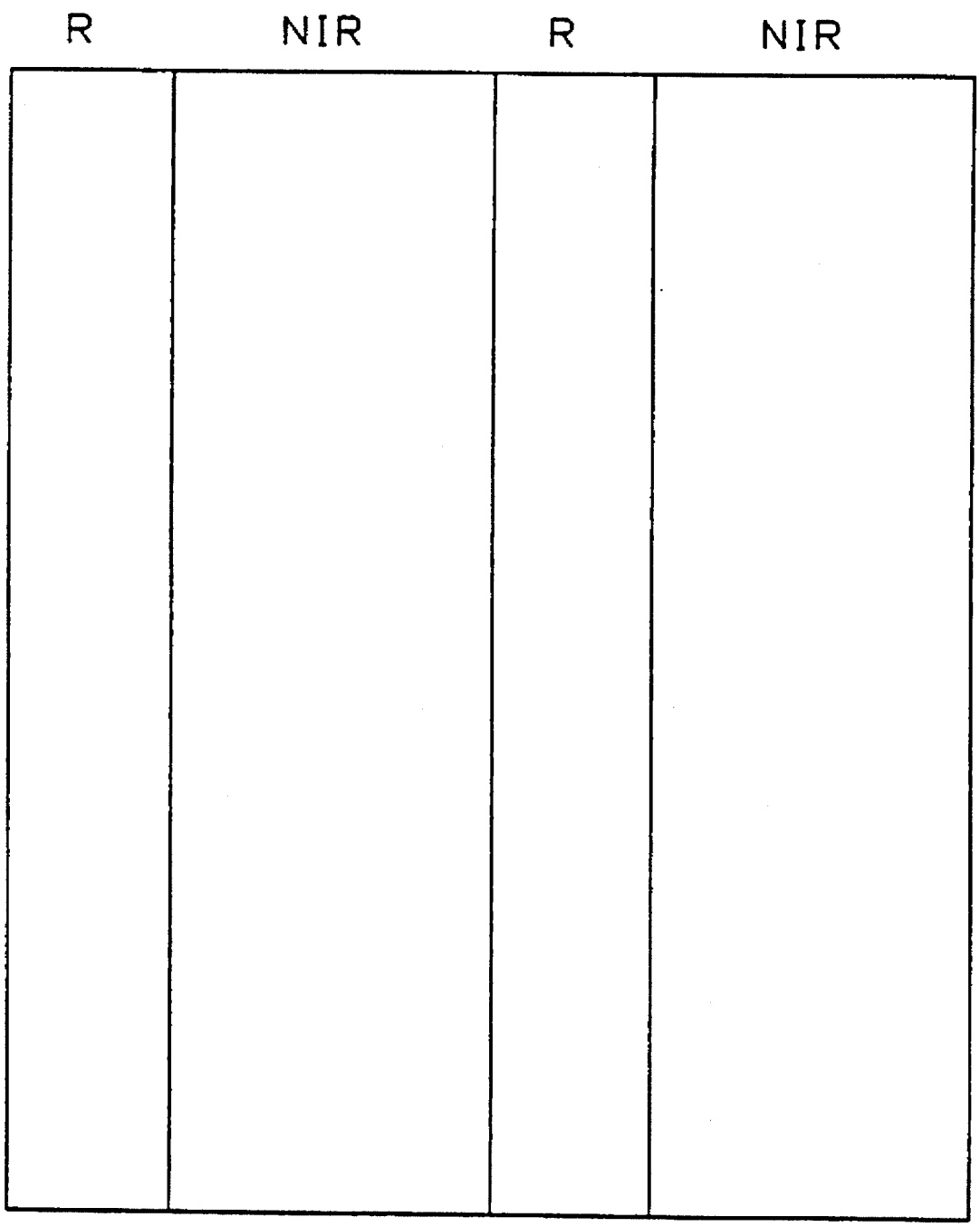
FIG. 3 is a diagram that illustrates a portion of a filter that is used to implement the invention with a camera of the type shown in FIG. 1.

FIG. 1 shows the pixels in a greatly enlarged view of a small area of a primary color red, green and blue pixel color CCD filter that is arranged into a vertical stripe pattern with red, green and blue pixels aligned in their own stripes. Horizontal stripe patterns may also be employed. FIG. 3 shows the filter pattern that is applied to implement the invention with the pixel pattern shown in FIG. 1 where the filter stripes labeled R overlay the red pixels and the filter stripes labeled NIR overlay the blue and green pixels. The CCD camera then produces signals on the red, green and blue output lines which, respectively, provide R and NIR values. Since the NIR signal-producing area is approximately twice as large as the R signal-producing area, the output strength of the NIR signal will be approximately twice as large as the output strength of the R signal assuming the response of the CCD pixels is equal for R and NIR light. Most CCD cameras have lower response to NIR light than to visible light, so this larger area can help compensate for the reduced sensitivity of the CCD to NIR light. This sensitivity imbalance can be handled in a signal processor or by adjusting the bandwidth or passband gain of the R and NIR filters to achieve the appropriate ratio.

Figure 2:
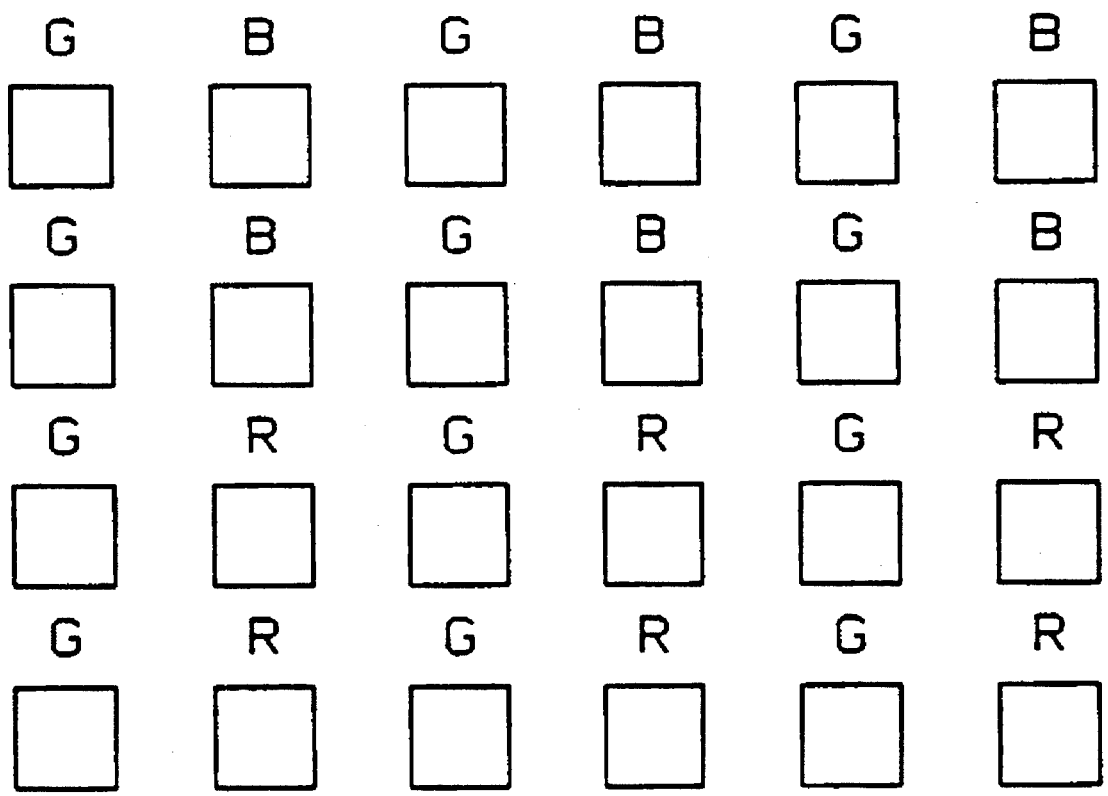
FIG. 2 is a diagram that illustrates a portion of the red, green and blue pixels of a primary color CCD camera that is implemented with the pixels aligned in a mosaic pattern.
Figure 4:
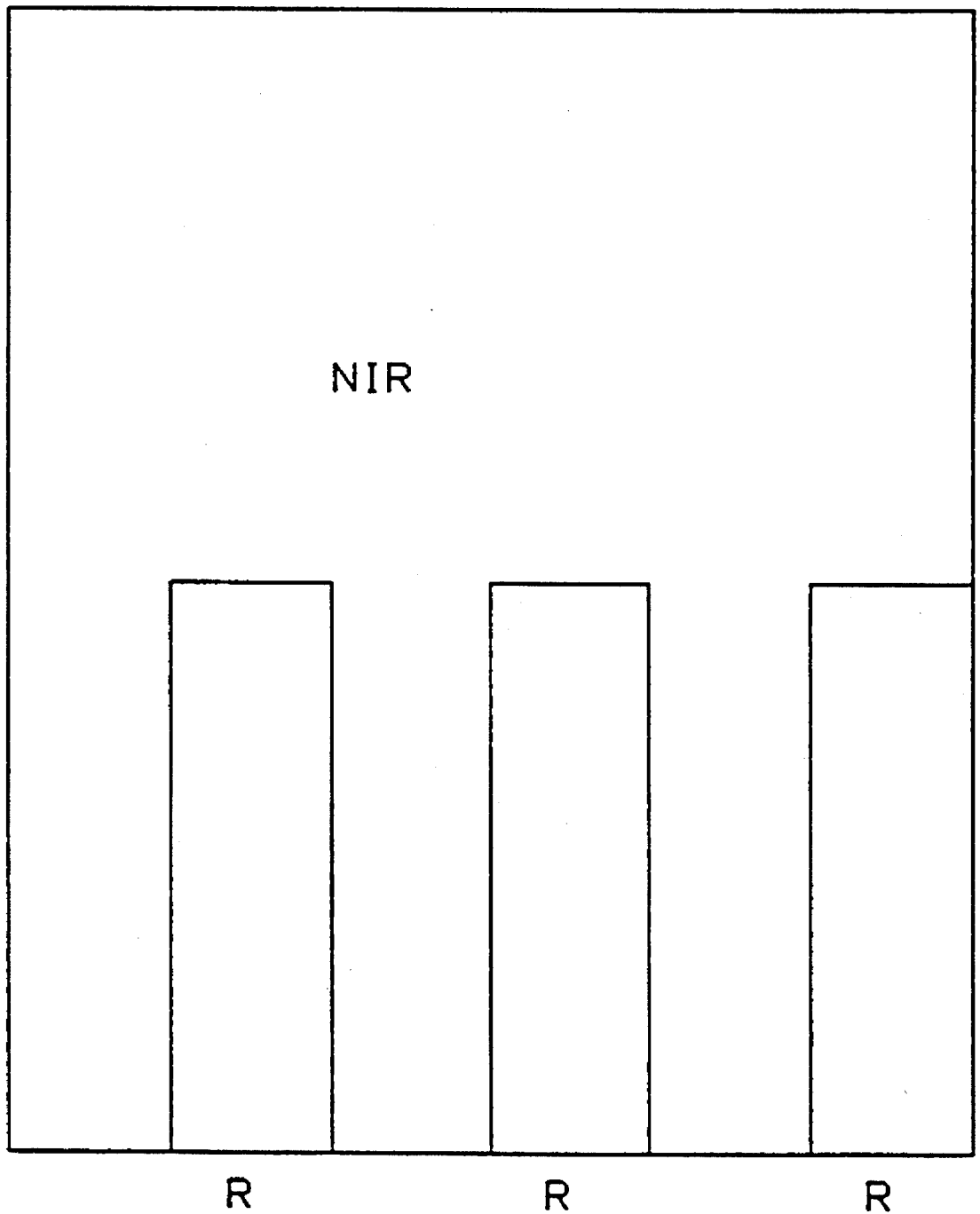
FIG. 4 is a diagram that illustrates a portion of a filter that is used to implement the invention with a camera of the type shown in FIG. 2.

FIG. 2 shows the pixels in a greatly enlarged view of an area of primary red, green and blue pixels that are arranged into a mosaic pattern. FIG. 4 shows the filter pattern that is applied to implement the invention with the pixel pattern shown in FIG. 2 where again the filter areas labeled R overlay the red pixels, and the filter areas labeled NIR overlay the blue and green pixels.

Figure 5:
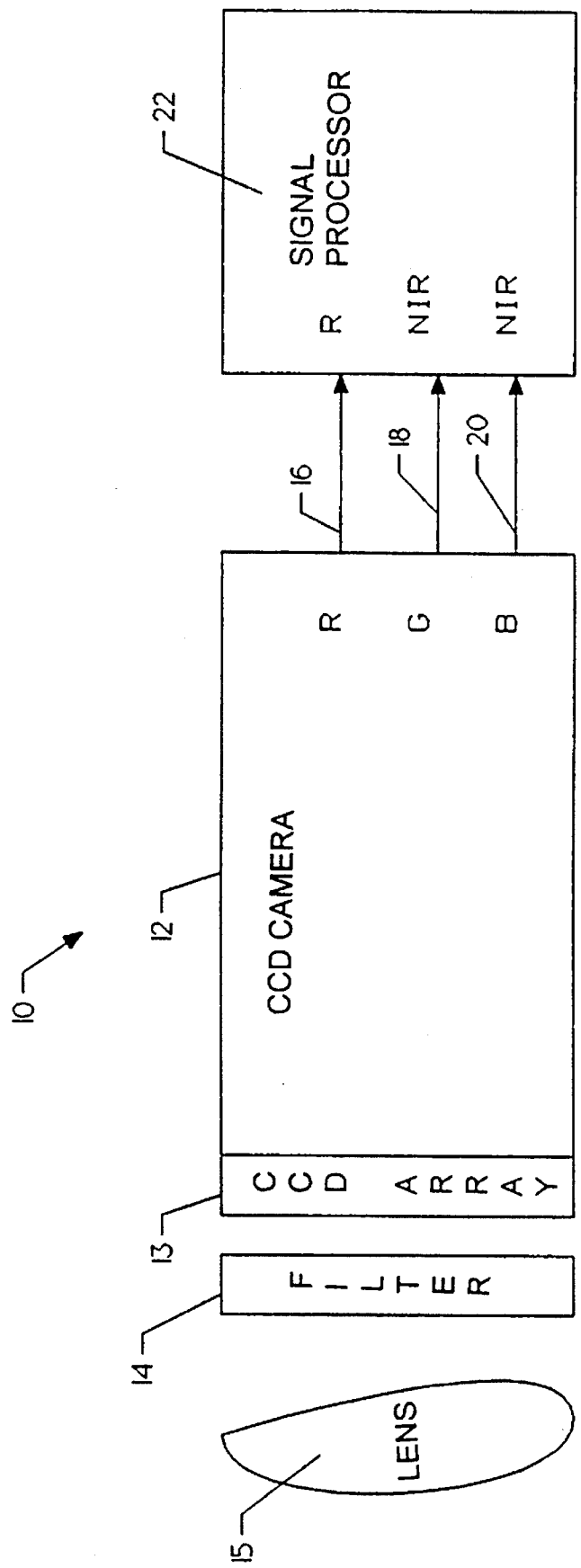
FIG. 5 is a block diagram of a CCD camera system that employs the invention.

FIG. 5 is a block diagram of a CCD camera system 10 in which the invention is implemented. A conventional CCD camera 12 has a CCD array 13 and a filter 14 located behind the lens 15 which directs the received image onto the filter 14. The CCD array 13 has red, green and blue output lines labeled 16, 18, 20, respectively. Because of the presence of the filter 14, the output of the line labeled R is a signal whose amplitude depends upon the intensity of light from only the R bandwidth, while the output of the lines 18, 20 depend upon the intensity of light from only the NIR bandwidth. Alternatively, the red, green and blue signals may be encoded onto a single line composite video and then decoded at the signal processor. The signal processor 22 which is coupled to the lines 16, 18 and 20 utilizes the signals on these lines to develop signals that represent relationships of R and NIR values that are known to be useful to detect the presence of vegetation from background objects.

The present invention provides for the separation of NIR and R filters on the pixels of the CCD camera to allow for optimal green plant detection on a pixel-by-pixel basis. It has advantages over the first two methods described above in that it can form multiple, high-resolution, well-registered pixels into an image of the scene in the field of view of the camera. The invention has advantages over prior systems in that it can process non-stationary scenes without pixel registration problems.

The invention has advantages over conventional black and white or color image gathering in that the use of the NIR to R ratios provides a more reliable means of detecting green biomass against a possibly complex (non-homogeneous) background, and it has the additional advantage that it can utilize currently available color video equipment for image transmission, storage, retrieval and processing.

What is claimed is:

1. A CCD camera system for detecting red (R) and near-infrared (NIR) wavelengths, comprising:

a) a color CCD camera comprising a multitude of pixels comprising red and near-infrared responsive pixels, green and near-infrared responsive pixels and blue and near-infrared responsive pixels arranged in a predefined pattern and constructed to provide signals on three output lines, at least a first one of which is representative of said R wavelengths, and at least a second one of which is representative of said NIR wavelengths, b) filter means overlying said multitude of pixels comprising first defined areas which allow red light to pass and which block near-infrared light and other light, and second defined areas which allow the near-infrared light to pass and which block other light, wherein said first defined areas are configured to cover only said red and near-infrared responsive pixels, and said second defined areas are configured to cover only said green and near-infrared responsive pixels and said blue and near-infrared responsive pixels of said CCD camera, and c) signal processing means coupled to said at least first and said at least second of said output lines to receive the signals therefrom which is constructed to provide predefined combinations of values which are dependent on the signals said signal processing means receives.

2. A CCD camera system as claimed in claim 1 wherein said at least said second of said output lines comprises a blue output signal line and a green output signal line for providing a first output signal on said blue output signal line which is representative of blue and near-infrared responsive signals and a second output signal on said green output signal line which is representative of green and near infrared responsive signals, and said multitude of pixels are arranged so that said red and near-infrared responsive pixels are aligned in a first row, said green and near-infrared responsive pixels are aligned in a second row, and said blue and near-infrared responsive pixels are aligned in a third row.

3. A CCD camera system as claimed in claim 1 wherein said at least said second of said output lines comprises a blue output signal line and a green output signal line for providing a first output Signal on said blue output signal line which is representative of blue and near-infrared responsive signals and a second output signal on said green output signal line which is representative of green and near-infrared responsive signals, and said multitude of pixels are configured into a mosaic pattern.

* * * * *